United States Patent [19]

Hamersma et al.

[11] Patent Number: 5,011,889

[45] Date of Patent: Apr. 30, 1991

[54] POLYMER, MIXTURE COMPRISING POLYPHENYLENE ETHER, POLYESTER, AND STYRENE POLYMER

[75] Inventors: Wilhelmus Hamersma, Bergen op Zoom, Netherlands; Roger W. Avakian, Brasschaat; Christian Bailly, Kalmthout, both of Belgium

[73] Assignee: General Electric Co., Selkirk, N.Y.

[21] Appl. No.: 122,954

[22] Filed: Nov. 19, 1987

[30] Foreign Application Priority Data

Dec. 8, 1986 [NL] Netherlands ................... 8603112

[51] Int. Cl.$^5$ ............... C08F 8/30; C08F 71/12
[52] U.S. Cl. .................. 525/133; 524/500; 525/68; 525/92; 525/146
[58] Field of Search .................. 525/133, 905

[56] References Cited

U.S. PATENT DOCUMENTS

| | | | |
|---|---|---|---|
| 3,383,435 | 5/1968 | Cizek | 525/132 |
| 3,773,718 | 11/1973 | Klebe et al. | 525/397 |
| 4,048,138 | 9/1977 | Miga | 1/177 |
| 4,590,241 | 5/1986 | Hohlfeld | |
| 4,672,086 | 6/1987 | Seiler et al. | |
| 4,746,708 | 5/1988 | Sybert | 525/397 |

FOREIGN PATENT DOCUMENTS

| | | |
|---|---|---|
| 0146965 | 3/1985 | European Pat. Off. |
| 159847 | 10/1984 | Japan ................... 525/897 |

Primary Examiner—Jacob Ziegler
Attorney, Agent, or Firm—Francis T. Coppa

[57] ABSTRACT

The invention relates to polymer mixtures which comprise a polyphenylene ether, one or more polyesters and a styrene polymer with side chains consisting entirely or partly of cyclic imino ether groups. The polymer mixtures have good properties, in particular a good impact strength in combination with good flow properties and a good chemical resistance.

7 Claims, No Drawings

POLYMER, MIXTURE COMPRISING POLYPHENYLENE ETHER, POLYESTER, AND STYRENE POLYMER

The invention relates to a polymer mixture which comprises
(A) a polyphenylene ether or a mixture thereof with a polystyrene, and
(B) a polyester or a mixture of two or more polyesters, and
(C) a styrene polymer with reactive groups.

Polymer mixtures which comprise a polyphenylene ether and a polyester are known from EP-A-0148774. These known polymer mixtures comprise in addition a phenoxy resin. These known polymer mixtures may comprise a styrene polymer with reactive groups, notably a styrene-maleic acid anhydride polymer The invention provides new polymer mixtures having an impact strength which is improved with respect to that of the polymer mixtures mentioned hereinbefore. Moreover, the new polymer mixtures have a favourable combination of properties, such as mechanical strength, resistance to chemical solvents, and flow properties in the melt.

The polymer mixtures according to the invention need not comprise phenoxy resin.

The polymer mixture according to the invention is characterized in that the polymer mixture comprises as a styrene polymer with reactive groups a styrene polymer with side chains consisting entirely or partly of cyclic imino ether groups.

The polymer mixture according to the invention preferably comprises as a styrene polymer with reactive groups a styrene polymer with side chains consisting entirely or partly of 2-oxazoline groups. The styrene polymer with reactive groups preferably comprises 0.01–10% by weight of units with cyclic imino ether side chains.

The constituents of the polymer mixture according to the invention mentioned hereinbefore may be present in any relative quantity. The composition preferably is within the following limits:
A. 10–65% by weight of polyphenylene ether or a mixture thereof with a polystyrene.
10–75% by weight of polyester or a mixture of two or more polyesters.
C. 2–25% by weight of a styrene polymer with side chains consisting entirely or partly of cyclic imino ether groups.

The weight ratio of constituent B plus C to constituent A is preferably chosen to be so that constituent B plus C constitutes the continuous phase in which constituent A is dispersed.

The polymer mixtures according to the invention may comprise as a constituent D a polymer with aromatic polycarbonate units. The polymer mixture according to the invention preferably comprises as a constituent D an aromatic polycarbonate homopolymer or an aromatic polyester carbonate. When the polymer mixture according to the invention comprises a constituent D, this is preferably used in a quantity from 0.5 to 40 parts by weight per 100 parts by weight of the sum of the constituents mentioned sub A, B and C.

In addition to the constituents mentioned hereinbefore, the polymer mixture according to the invention may comprise further constituents. Examples of further constituents are agents to improve the impact strength and agents to suppress transesterification.

As a polyester the polymer mixture according to the invention preferably comprises a polymer derived from a diol component consisting for more than 50 mol.% of butanediol and a dicarboxylic acid component consisting for more than 50 mol.% of terephthalate or a polyester mixture consisting of a first polyester the diol component of which is built up for more than 50 mol.% from units derived from butanediol and the dicarboxylic acid component of which is derived for more than 50 mol.% from terephthalic acid and a second polyester the diol component of which is built up for more than 50 mol.% from units derived from ethanediol and the dicarboxylic acid component of which is derived for more than 50 mol.% from terephthalic acid.

In addition to optionally present constituents, the polymer mixtures according to the invention comprise at any rate one or more polymers selected from each of the constituents mentioned hereinbefore sub A, B and C.

It is possible that two or more of the constituents mentioned sub A, B and C react with each other. The invention therefore also includes polymer mixtures which comprise one or more reaction products of the said constituents.

A. Polyphenylene ether or a mixture thereof with a polystyrene

The polyphenylene ethers (also known as polyphenylene oxides) which form entirely or partly constituent A in the polymer mixtures according to the invention, comprise a large number of structural units of formula (I)

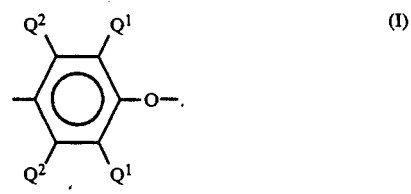

In each of these units separately, each $Q^1$ represents individually a halogen, a primary or secondary lower alkyl (i.e. an alkyl having 1-7 carbon atoms), phenyl, haloalkyl, amino alkyl, hydrocarbonoxy or halohydrocarbonoxy, in which at least two carbon atoms separate the halogen and oxygen atoms, and each $Q^2$ individually represents a hydrogen, a halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Optionally present alkyl radicals preferably have a straight chain instead of a branched one. In most of the cases, each $Q^1$ is an alkyl or phenyl, in particular a $C_{1-4}$ alkyl, and each $Q^2$ a hydrogen. Suitable polyphenylene ethers are described in a great number of Patents.

Homopolymeric and copolymeric polyphenylene ethers are suitable. Suitable homopolymers are those which comprise, for example, 2,6-dimethyl-1,4-phenylene ether units. Suitable copolymers are, for example, random copolymers which comprise such units in combination with, for example, 2,3,6-trimethyl-1,4-phenylene ether units. Many suitable random copolymers and homopolymers have been described in the patent literature.

Also suitable are polyphenylene ethers which comprise parts which modify properties, such as molecular weight, melt viscosity and/or impact strength. Such polymers have been described in the patent literature and can be prepared by grafting on the polyphenylene ether according to known methods vinyl monomers, such as acrylonitrile and vinylaromatic compounds (for example, styrene) or polymers, such as polystyrenes and elastomers. The product usually comprises grafted and non-grafted parts. Further suitable polymers are the coupled polyphenylene ethers in which the coupling agent is converted in known manner with the hydroxy groups of two polyphenylene ether chains, a polymer being formed having a higher molecular weight and comprising the reaction product of the hydroxy groups and the coupling agent. Examples of coupling agents are polycarbonates having a low molecular weight, quinone compounds, heterocyclic compounds and formal compounds.

The polyphenylene ether usually has a number-averaged molecular weight of approximately 3,000 to 40,000 and a weight-averaged molecular weight of approximately 20,000–80,000 determined according to gel permeation chromatography. The intrinsic viscosity is usually between approximately 0.15 and 0.6 parts/g and is preferably at least 0.25 parts/g measured in chloroform at 25° C.

Polyphenylene ethers are conventionally prepared by oxidative coupling of at least one corresponding monohydroxy aromatic compound. Particularly suitable and readily obtainable monohydroxyaromatic compounds are 2,6-xylenol (in which each $Q^1$ represents a methyl and each $Q^2$ represents a hydrogen), resulting in a poly(2,6-dimethyl-1,4-phenylene ether) polymer and 2,3,6-trimethyl phenol (in which each $Q^1$ and one $Q^2$ represents methyl and the second $Q^2$ represents hydrogen).

A number of catalyst systems are known for preparing polyphenylene ethers by oxidative coupling. There is no particular restriction with regard to the choice of the catalyst and any of the known catalysts may be used. For the greater part they comprise at least a heavy metal compound, for example, a copper, manganese or cobalt compound, usually in combination with various other materials.

A first class of preferably used catalyst systems is that which comprises a copper compound. Such catalysts are disclosed, for example, in U.S. Pat. Nos. 3,306,874; 3,306,875; 3,914,266 and 4,028,341. It usually relates to combinations of cuprous and cupric ions, halide (i.e. chloride, bromide or iodide) ions and at least an amine.

Catalyst systems which comprise manganese compounds constitute a second type which is preferably used. In this case it usually relates to alkaline systems in which bivalent manganese is combined with anions, for example, halide, alkoxide or phenoxide. In most of the cases the manganese is present in the form of a complex with one or more comlex-forming agents and/or chelating agents, for example, dialkylamines, alkanolamines, alkylenediamines, O-hydroxyaromatic aldehydes, O-hydroxyazo compounds; omega-hydroxyoximes (monomeric and polymeric), O-hydroxyaryl oximes and beta-diketone compounds.

Known cobalt-containing catalyst systems are also suitable. Suitable catalyst systems comprising manganese and cobalt for preparing polyphenylene ethers are generally known since they have been described in numerous patent specifications and publications.

Polyphenylene ethers which may be used in the invention are also those which comprise molecules with at least one of the terminal groups of formulae II and III

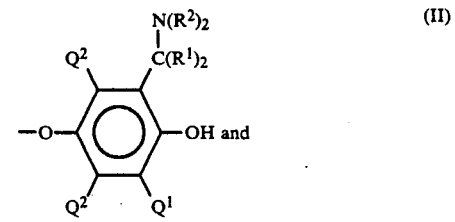

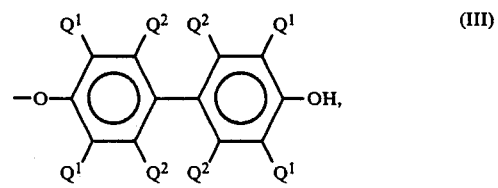

in which $Q^1$ and $Q^2$ have the same meanings as indicated hereinbefore; in which each $Q^1$ individually represents hydrogen or alkyl, in which the total number of carbon atoms in both $R^1$ radicals is six or less; and each $R^2$ individually represents hydrogen or a $C_{1-6}$ primary alkyl radical. Each $R^1$ is preferably hydrogen and each $R^2$ is alkyl, in particular methyl or n-butyl.

Polymers with terminal groups of formula II (hereinafter termed "aminoalkyl terminal groups") can also be formed by incorporating a suitable primary or secondary monoamine as one of the constituents of the oxidative coupling reaction mixture, in particular when a catalyst containing copper or manganese is used. Such amines, in particular the dialkylamines and preferably di-n-butylamine and dimethylamine, are regularly bound chemically to the polyphenylene ether, usually by replacing one of the alpha-hydrogen atoms on one or more $Q^1$ radicals. The main reaction place is the $Q^1$ radical situated beside the hydroxy group on the terminal unit of the polymer chain. During further processing and/or mixing the aminoalkyl terminal groups may be subject to various reactions, in which a quinonemethide type intermediate product of formula V

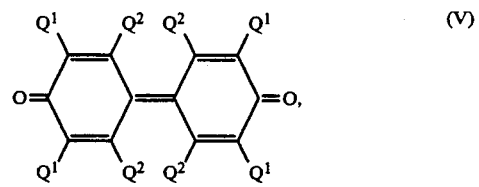

wherein $Q^1$ and $Q^2$ are as described above, wherein $Q^1$ and $Q^2$ are as described above, probably plays a role, numerous favourable occurring, often including an increase of the impact strength and a compatibilisation with other constituents in a mixture.

For this purpose, reference may be made to the U.S. Pat. Nos. 4,054,553; 4,092,294; 4,477,649; 4,477,651 and 4,517,341, the contents of which are considered to be incorporated herein by reference.

Polymers with 4-hydroxybiphenyl terminal groups of formula III are usually obtained from reaction mixtures in which a byproduct diphenone quinone of formula V (see page 24) is present, in particular in a copper-halide secondary or tertiary amine system. In this respect the contents of U.S. Pat. Specification No. 4,477,649 are of importance, as well as those of the U.S. Pat. Nos. 4,234,706 and 4,482,697 which are also considered to be incorporated herein by reference. The diphenone quinone is ultimately incorporated in the polymer in mixtures of this type in comparatively large quantities, for the greater part as a terminal group.

In many polyphenylene ethers which are obtained under the above-mentioned conditions, a large part of the polymer molecules, for example, approximately 90% by weight of the polymer, comprises terminal groups of one or sometimes both of the formulae II and III. It will be obvious that other terminal groups may also be present and that the invention in its widest form does not depend on the molecule structure of the polyphenylene ether terminal groups.

From the above it wil be obvious to those skilled in the art that the polyphenylene ethers which may be used in the invention comprise all the so far known polyphenylene ethers independently of variations in structural units or further chemical aspects.

The polyphenylene ethers in the polymer mixtures according to the invention may also be used in the form of a mixture with one or more polystyrene compounds. "Polystyrenes" are to be understood to mean polymers which are prepared according to known methods, for example, by bulk-, suspension- and emulsion polymerisation and which comprise at least 25% by weight of structural units derived from a monomer of formula VI

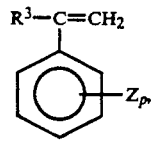

(VI)

in which $R^3$ is a hydrogen atom, a lower alkyl or halogen. Z is a vinyl, halogen or lower alkyl, and p has a value from 0 to 5. They include homopolymers of styrene, chlorostyrene and vinyl toluene, random copolymers of styrene with one or more monomers, for example, acrylonitrile, butadiene, alpha-methyl styrene, ethylvinyl benzene, divinyl benzene and maleic acid anhydride and rubber-modified polystyrenes, including mixtures and graft products, in which the rubber is, for example, a polybutadiene or a rubber-like copolymer with approximately 98-70% of styrene and 2-30% of diene monomer. High-impact polystyrenes or HIPS are to be included in these rubber-modified polystyrenes.

The relative quantity of polystyrene in constituent A is not critical, since polyphenylene ethers and polystyrenes are miscible in all relative quantities. Constituent A will usually comprise approximately 5-50% by weight of polystyrene, if at all present.

B. Polyester or a mixture of two or more polyesters

Constituent B of the polymer mixtures according to the invention consists of a polyester or a mixture of two or more polyesters. Polyesters are, for example, the reaction products of one or more diol compounds and one or more dicarboxylic acids. It is possible to replace in the polyesters the diol compounds entirely or partly by tri- or tetra-ol compounds. It is further possible to replace the dicarboxylic acids entirely or partly by poly acids. Further suitable polyesters are the products obtained by a ring-openining lacton polymerisation, for example, polycaprolacton.

The diol compounds may haVe an aromatic, alicyclic or aliphatic nature. It is possible to use a mixture of several diol compounds, for example, an aromatic and an aliphatic diol compound.

The dicarboxylic acids may also be aromatic, alicyclic or aliphatic by nature. It is possible to use a mixture of several dicarboxylic acids, for example, of an aromatic and an aliphatic diol compound.

The polyesters may be entirely aromatic, partly aromatic, or also entirely aliphatic. The only condition is that they can be processed as thermoplasts.

Particularly suitable diol compounds for the polyesters as used in the polymer mixtures according to the invention are, for example, ethanediol, butanediol, hexanediol, cyclohexanedimethanol, diethylene glycol, triethylene glycol and etherdiol compounds.

Also suitable are the well known polyester esters such as for example described in J. Polymer Sci : Symposium No. 48, 47-60 (1974), W.H. Buck et al. and the polyetherimide esters such as described for example in U.S.-A-4,552,950 and EP-A-0,179,470.

Particularly suitable dicarboxylic acids are terephthalic acid and isophthalic acid or also mixtures of these two acids.

Particularly suitable polyesters are the polyesters the diol component of which is derived for more than 50 mol.% from butanediol and the dicarboxylic acid component of which is derived for more than 50 mol.% from terephthalic acid.

Very suitable are furthermore polyester mixtures which, in addition to the just-mentioned polyester, comprise a second polyester the diol component of which is built up for more than 50 mol.% from units derived from ethanediol and the dicarboxylic acid component of which is derived for more than 50 mol.% from terephthalic acid.

Copolyesters derived from a diol component consisting of 1,4-cyclohexanedimethanol and/or ethanediol and from a dicarboxylic acid component consisting of terephthalic acid and/or isophthalic acid are also suitable.

C. Styrene polymer with reaction groups

As the third essential component (C), the polymer mixtures according to the invention comprise a reactive styrene polymer with side chains consisting entirely or partly of cyclic imino ether groups. The styrene polymer comprises preferably 0.01-10%, more preferably 2-10% by weight of units with cyclic imino ether side chain. Such polymers are known per se. They are described, for example, in EP-A-0146965. A reactive styrene polymer with 2-oxazoline side chains is preferably used. The preparation of such a polymer is known, for example, from U.S. Pat. No. 3,509,235.

The polymer mixture according to the invention may comprise as constituent D a polymer with aromatic polycarbonate units.

D. Polymer with aromatic polycarbonate units

The polymer mixtures according to the invention comprise as constituent D one or more polymers with aromatic polycarbonate units. Such polymers are known per se. They are generally prepared by reacting a dihydric phenol compound with a carbonate precursor, for example, phosgene, a halogen formate or a carbonate ester. Aromatic polycarbonates- are polymers which comprise units of formula VII

in which A is a bivalent aromatic radical which is drived from the dihydric phenol which is used in the preparation of the polymer. As dihydric phenols in the preparation of the aromatic polycarbonates may be used mononuclear or polynuclear aromatic compounds which contain two hydroxy radicals which are each bound directly to a carbon atom of an aromatic nucleus.

Examples of suitable dihydric phenols are:
2,2-bis-(4-hydroxyphenyl)propane;
hydroquinone; resorcinol;
2,2-bis(hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxyphenyl;
2,6-dihydroxynaphthalene;
bis-(4-hydroxydiphenyl)sulphone;
bis-(3,5-diethyl-4-hydroxyphenyl)sulphone;
2,2-bis(3,5-dimethyl-4-hydroxyphenyl)propane;
2,4'-dihydroxyphenyl sulphone;
5'-chloro-2,4'-dihydroxydiphenyl sulphone;
bis-(4-hydroxyphenyl)diphenyl sulphone;
4,4'-dihydroxydiphenyl ether;
4,4'-dihydroxy-4,4'-dichlorodiphenyl ether;
4,4'-dihydroxy-2,5-dihydroxydiphenyl ether.

Other likewise suitable dihydric phenols are described in U.S. Pat. Nos. 2,999,835; 3,038,365; 3,334,154 and 4,131,575.

The aromatic polycarbonates can be prepared according to methods known per se: for example, by reacting a dihydric phenol with a carbonate precursor, for example, phosgene. For this purpose, reference may be made to the just-mentioned U.S. Pat. Specifications and to U.S. Pat. No. 4,018,750 and 4,123,426. They can also be prepared by a transesterification as described in U.S. Pat. No.3,153,008.

The known, branched polycarbonates as described, for example, in U.S. Pat. No. 4,001,184 are also suitable.

Suitable aromatic polycarbonates are also the so-called polyester carbonates which are obtained by carrying out the polymerisation reaction in the presence of an ester precursor, for example, a difunctional carboxylic acid, for example, terephthalic acid or an ester-forming derivative thereof. These polyester carbonates have ester and carbonate compounds in the polymeric chain. polyester carbonates are described, for example, in U.S. Pat. No. 3,169,121.

In the polymer mixtures according to the invention it is also possible to use a mixture of various polycarbonates as mentioned hereinbefore as an aromatic polycarbonate.

In addition to the above-mentioned constituents the polymer mixture may comprise conventional additives for polymer mixtures, for example, agents to improve the impact strength, agents to improve the flame-retarding properties, inert fillers, reinforcing fibres, stabilisers, mould-release agents, dyes, pigments. In particular may be mentioned the agents to improve the impact strength and stabilisers.

As agents to improve the impact strength are to be considered in particular those agents which are suitable to improve the impact strength of polyphenylene ethers. By way of example are mentioned various elastomeric copolymers, for example, ethylene-propylene-diene polymers (EDPM) which may be functionalised, for example, with sulphonate or phosphonate groups; carboxylated ethylene-propylene rubbers; block copolymers of alkenylaromatic compounds, for example, styrene with polymerisable olefins or dienes, for example, butadiene, isoprene, chloroprene, ethylene, propylene and butylene, and so-called core-shell elastomers with, for example, a poly(alkylacrylate) core on which a polystyrene-containing shell is locked. Block copolymers (usually diblock-, triblock-, or radical teleblock copolymers) of alkenylaromatic compounds and diene compounds are preferably used. In most of the cases, at least one other block is derived from butadiene and/or isoprene. Triblock copolymers with polystyrene terminal blocks and central blocks derived from diene are preferably used in particular. It often presents advantages to use such triblock copolymers in which the unsaturated character of the diene central blocks is removed entirely or partly or is reduced by (selective) hydrogenation. The weight-average molecular weight of the impact strength-improving agents is usually between 50,000 and 300,000.

The polymer mixtures according to the invention may comprise one or more stabilisers. These may be selected from the stabilisers generally known for the polymers used in the polymer mixture according to the invention. Meant are stabilisers against oxidation, against thermal decomposition of the polymers and also stabilisers which can prevent or suppress a transesterification reaction between the esters (constituents B and D) and carbonates present in the polymer mixtures according to the invention. Stabilisers of the last-mentioned type are conventionally used in a quantity from 0.01–7.5 parts by weight per 100 parts by weight of polyester plus polycarbonate. It generally is to be preferred to pre-mix such stabilisers with the polyester. Examples of suitable stabilisers of this type are hydroxy-aromatic compounds, for example, the hydroxy benzophenone compounds described in U.S. Pat. No. 4,452,932, salicylate compounds, for example, methyl salicylate described in U.S. Pat. No. 4,452,933, and sodium and potassium dihydrogen phosphates described in U.S. Pat. No. 4,532,290.

The polymer mixtures according to the invention are usually prepared by mixing the constituents thereof under such circumstances that a readily distributed mixture is obtained. For that purpose, mixing is often carried out in an extruder, usually in a blade extruder, in which strong shearing forces occur so that the particle size of the individual constituents is reduced. An extrusion temperature of approximately 100–325° C. is usually used.

The extrusion conditions used can influence the impact strength and the other properties of the polymer mixture. It is possible to pre-extrude certain constituents or a part of certain constituents individually or in combination. The pre-extrudates thus formed are then extruded with the remaining constituents. It is also possible to use extruders having different filling apertures for different constituents. For example, a part of the constituents or an optionally formed pre-extrudate may be added while being as far as possible remote from the nozzle of the extruder, the remaining constituents being intruduced into the extruder via a filling aperture which is situated nearer the nozzle. Different temperatures may be adjusted in the extruder over the length thereof.

The invention will now be described in greater detail with reference to the ensuing specific examples.

EXAMPLES I AND II, COMPARATIVE EXAMPLES A AND B

In these examples the following constituents were used:

PPE: poly(2,6-dimethyl-1,4-phenylene)ether having an intrinsic viscosity of 0.46 parts/g, measured in chloroform at 25° C., prepared with a copper amine catalyst.

PBT: polybutyleneterephthalate having an intrinsic viscosity of 1.19 parts/g measured in phenol/tetrachloroeathane 60/40 at 25° C.

PC: a bisphenol A homopolycarbonate having an intrinsic viscosity of 0.63 parts/g measured in methylene chloride at 25° C.

rPS: a reactive polystyrene consisting of polystyrene with approximately 1% by weight of oxazoline side chains.

S-MA: a styrene-maleic acid anhydride polymer modified with 15% by weight of rubber (MA: 10 mol.%; weight-averaged molecular weight 170,000).

I.M.: a selectively hydrogenated styrene-butadiene/isoprene-styrene triblock copolymer having a weight-averaged molecular weight of approximately 200,000.

Stabilizers: a thioester plus a hindered phenol.

The polymer mixtures were prepared as follows. The polyphenylene ether and the I.M. were pre-extruded at 320° C. in an extruder (300 rpm). The resulting pre-extrudate was then extruded in the same extruder together with the remaining constituents (temperature 260° C., 250 rpm). In example II the reactive polystyrene (rPS) and the polyester (PBT) were also supplied in the form of a pre-extrudate (pre-extrusion temperature 250° C., 250 rpm).

Standarized test rods were injection moulded from the resulting polymer mixtures for the determination of the notch impact strength according to Izod; the notch impact strength according to Charpy, the Vicat B/120 value, the tensile strength, the elongation at fracture. Moreover the viscosity of the melt was determined at 280° C. and a shear rate of 1,500 s$^{-1}$.

The composition of the various polymer mixtures and the found properties are recorded in Table A hereinafter.

TABLE A

| Example | A | B | I | II |
|---|---|---|---|---|
| Composition (parts by weight) | | | | |
| PPE | 40 | 30 | 30 | 30 |
| PBT | 40 | 40 | 40 | 40 |
| PC | 8 | 8 | 8 | 8 |
| rPS | — | — | 10 | 10 |
| S-MA | — | 10 | — | — |
| I.M. | 12 | 12 | 12 | 12 |
| Stabilizers | 0.6 | 0.6 | 0.6 | 0.6 |
| Properties | | | | |
| Impact strength according to Izod (J/m) | | | | |

TABLE A-continued

| Example | A | B | I | II |
|---|---|---|---|---|
| room temperature | 215 | 80 | 230 | 200 |
| −30° C. | 115 | 40 | 105 | 105 |
| Impact strength according to Charpy (kJ/m$^2$) | | | | |
| room temperature | 33.5 | 7.0 | 19.0 | 29.5 |
| −30° C. | 8.5 | 3.0 | 7.5 | 8.0 |
| Vicat B/120 (°C.) | 161 | 143 | 152 | 152 |
| Tensile strength (MPa) | 51 | 54 | 55 | 56 |
| Elongation (%) | 34 | 22 | 24 | 26 |
| Melt viscosity (Pa.s) | 415 | 335 | 320 | 330 |

It may be seen from the values of Table A that polymer mixtures which contain PPE and PBT (comparative example A) have good mechanical properties, in particular a good impact strength. Unfortunately, these polymer mixtures have a comparatively high melt viscosity so that they are difficult to process.

Polymer mixtures which in addition comprise a reactive polystyrene (S-MA) as used in EP-A-0148774 have a strongly reduced melt viscosity (comparative example B). The impact strength of these polymer mixtures, however, is strongly reduced as compared with the impact strength of the polymer mixture according to comparative example A.

The polymer mixtures according to the invention (examples I and II) have a favourable combination of melt viscosity and mechanical properties, in particular the notch impact value; this is associated with the use of a special type of reactive polystyrene as described in the claims of the present Patent Application. In itself it is surprising that the polymer mixtures according to the invention (examples I and II) have a better impact strength than the polymer mixture according to comparative example B. In fact, the polymer mixture according to B comprises a S-MA modified with 15% by weight of rubber. Such a S-MA is often used in polymer mixtures to improve the impact strength.

The resistance to chemical solvents of the above-mentioned polymer mixtures was determined. For that purpose, rods — indented for the determination of the tensile strength according to ASTM — from various polymer mixtures were manufactured by injection moulding. The rods were clamped in a mould and bent, so that an elongation of 0.7% occurred. Clamped in the mould, the rods were immersed in a mixture of solvents consisting of 42.5% of toluene, 42.5% of iso-octane, and 15% of methanol for the period stated hereinafter in Table B. The rods were laid on an apparatus for determining the impact strength according to Charpy. The notch impact value was determined. Moreover, the tensile strength and the elongation at fracture of the rods thus treated were measured. Finally the increase in weight as a result of the incorporated quantity of solvents was determined.

The results obtained are recorded in Table B.

TABLE B

| Polymer mixture according to example | A | B | I | II |
|---|---|---|---|---|
| Properties after immersing for 16 hours | | | | |
| Charpy impact strength (kJ/m$^2$) | — | 67 | 89 (NB) | — |
| Tensile strength (mPa) | — | 39 | 48 | — |
| Elongation (%) | — | 17 | 33 | — |
| Increase in weight (%) | — | 5.7 | 3.7 | — |

TABLE B-continued

| Polymer mixture according to example | A | B | I | II |
|---|---|---|---|---|
| After 24 hours | | | | |
| Charpy impact strength (kJ/m$^2$) | 98 (NB) | 50 | — | 98 (NB) |
| Tensile strength (mPa) | 39 | 36 | — | 44 |
| Elongation (%) | 25 | 13 | — | 18 |
| Increase in weight (%) | 6.7 | 6.9 | — | 4.8 |
| After 84 hours | | | | |
| Charpy impact strength (kJ/m$^2$) | 95 (NB) | | | 98 (NB) |
| Tensile strength (mPa) | 21 | | | 31 |
| Elongation (%) | 38 | | | 46 |
| Increase in weight (%) | 14.0 | | | 10.5 |

NB = not broken

It may be seen from Table B that the resistance to chemical solvents becomes worse by the addition of S-MA to a polyphenylene ether - polyester mixture (comparative example B vs. comparative example A) The addition of a reactive polystyrene according to the invention does not lead to a deterioration of the resistance to chemical solvents; in some respects it even leads to an improvement.

EXAMPLE III

A further polymer mixture was prepared from 48 parts by weight of the same type of PBT as used in examples I and II, 20 parts by weight of the same type of PPE as used in examples I and II, 4 parts by weight of a reactive polystyrene consisting of polystyrene with approximately 5.6% by weight of oxazoline side chains, 8 parts by weight crystal clear polystyrene, 10 parts by weight of a functionalised EPDM rubber, 10 parts by weight of the same I.M as used in examples I and II and 0.6 parts by weight of stabilizers. The PBT, the reactive polystyrene, the crystal clear polystyrene and the stabilizers were preextruded on a Werner Pfleiderer type 28 extruder. The obtained precompound was dried (2 hours at 120° C.). Thereafter the preextrudate was extruded: together with the remaining constituents on the same extruder.

The obtained properties are indicated in Table C here below.

| Impact strength according to Izod (J/m) | |
|---|---|
| Room temperature | 199 |
| −30° C. | 89 |
| Tensile strength (MPa) | 40 |
| Elongation (%) | 44 |
| Melt viscosity (PA.s) | 310 |

As can be seen the polymer mixture according to example III has a good combination of flow and impact properties as measured according to Izod.

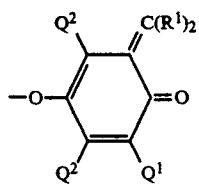

(IV)

We claim:
1. A polymer mixture which comprises:
   (A) a polyphenylene ether or a mixture thereof with a polystryrene, and
   (B) a polyester or a mixture of two or more polyesters, and
   (C) a styrene polymer with side chains consisting entirely or partly of cyclic imino ether groups, wherein the polyphenylene ether is a homopolymer or copolymer having the formula

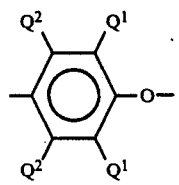

wherein each Q$^1$ is individually selected from the group consisting of halogen, primary or secondary lower alkyl, phenyl, haloalkyl, amino alkyl, hydrocarbonoxy, and halohydrocarbonoxy, in which at least two carbon atoms separate the halogen and oxygen atoms, and each Q$^2$ is individually selected from the group consisting of hydrogen, halogen, primary or secondary lower alkyl, phenyl, haloalkyl, hydrocarbonoxy, and halohydrocarbonoxy as defined for Q$^1$.

2. The polymer mixture of claim 1, wherein the side chains consist entirely or partly of 2-oxazoline groups.

3. A polymer mixture as claimed in claim 1, characterized in that the styrene polymer comprises 0.01-10% by weight of units with cyclic imino ether side chain.

4. A polymer mixture as claimed in claim 3, characterised in that the styrene polymer comprises 2-10% by weight of units with cyclic imino ether side chain.

5. A polymer mixture as claimed in claim 1, characterized in that the polymer mixture comprises
   A. 10-65% by weight of polyphenylene ether or a mixture thereof with a polystyrene, and
   B. 10-75% by weight of polyester or a mixture of two or more polyesters, and
   C. 1-25% by weight of a styrene polymer with side chains consisting entirely or partly of cyclic imino ether groups,
calculated with respect to the sum of the parts by weight of the constituents mentioned sub A, B, and C.

6. A polymer mixture as claimed in claim 1, characterized in that the polymer mixture comprises as a polyester a polymer derived from a diol component consisting for more than 50 mol.% of butanediol and a dicarboxylic acid component consisting for more than 50 mol. % of terephthalic acid.

7. A polymer mixture as claimed in claim 1, characterized in that the polymer mixture comprises as a polyester a polyester mixture consisting of a first polyester the diol component of which is built up for more than 50 mol.% of units derived from butanediol and the dicarboxylic acid component of which is derived for more than 50 mol.% from tetrephthalic acid and a second polyester the diol component of which is built up for more than 50 mol.% from units derived from ethanediol and the dicarboxylic acid component of which is derived for more than 50 mol.% from terephthalic acid.

* * * * *